US006577409B1

(12) United States Patent
Barker et al.

(10) Patent No.: US 6,577,409 B1
(45) Date of Patent: Jun. 10, 2003

(54) METHOD AND APPARATUS FOR CONTROLLING A SCANNING DEVICE

(75) Inventors: John C. Barker, Houston, TX (US); Montomgery C. McGraw, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/253,192

(22) Filed: Feb. 19, 1999

(51) Int. Cl.⁷ ................................................ H04N 1/32
(52) U.S. Cl. ........................................ 358/468; 382/317
(58) Field of Search ................................. 398/468, 443, 398/442; 382/317

(56) References Cited

U.S. PATENT DOCUMENTS

| | | | | |
|---|---|---|---|---|
| 3,751,582 A | * | 8/1973 | Wernikoff et al. .............. 178/6 |
| 4,352,012 A | * | 9/1982 | Verderber et al. ........... 358/403 |
| 5,051,779 A | | 9/1991 | Hikawa ....................... 355/200 |
| 5,075,787 A | | 12/1991 | Shughnessy ................. 358/452 |
| 5,126,858 A | * | 6/1992 | Kurogane et al. ........... 358/450 |
| 5,159,635 A | * | 10/1992 | Wang ........................... 358/51 |
| 5,161,037 A | * | 11/1992 | Saito ........................... 358/434 |
| 5,361,134 A | | 11/1994 | Hu .............................. 358/296 |
| 5,386,298 A | * | 1/1995 | Bronnenberg et al. ....... 358/403 |
| 5,563,986 A | * | 10/1996 | Suzuki ......................... 395/114 |
| 5,630,079 A | * | 5/1997 | McLaughlin ................. 345/734 |
| 5,673,105 A | | 9/1997 | Brook, III ..................... 355/75 |
| 5,881,214 A | | 3/1999 | Morisawa .................... 395/117 |
| 6,002,491 A | * | 12/1999 | Li et al. ....................... 358/436 |
| 2001/0040685 A1 | | 11/2001 | Winter ........................ 358/1.6 |
| 2001/0043369 A1 | | 11/2001 | Melen ......................... 358/468 |

FOREIGN PATENT DOCUMENTS

JP    A-405219316    8/1993

* cited by examiner

Primary Examiner—Thomas D. Lee

(57) ABSTRACT

A technique is disclosed for programming instructions into a system including a scanning device. The instructions are defined by machine and human readable indicia on an instruction support sheet. A document is associated with the instruction support sheet and may be processed with the instructions. Desired instructions may be selected by annotations on the instruction sheet. The instruction sheet is then scanned to encode the selections. Data sets corresponding to the composition of the instruction sheet are accessed to interpret the selected instructions. Based upon the selected instructions, operations are performed on the document. The operations may include scanning, transmission of facsimiles, transmission of electronic messages, archival storage, and so forth. The instruction sheet may be composed and configured in accordance with needs of individual users. The scanning device may be associated with a computer system or may be a stand-alone device.

37 Claims, 6 Drawing Sheets

*FIG. 3*

CONTROL FORM

FAX CONTROL PANEL

FAX CONTROLS

| COVER PAGE | CONFIRMATION REPORT |
|---|---|
| ☐ COVER PAGE | ☐ HARDCOPY |
| ☐ COMPANY LOGO | ☐ HARDCOPY/W COVER |
| ☐ URGENT | ☐ E-MAIL CONFIRM |
| ☐ GREYSCALE MODE | |

ADD FAX NOTE HERE:

FROM:

| | |
|---|---|
| ☐ MARK PHISH | ☐ DEMITRI CARLS |
| ☐ STEVE JOHNSON | ☐ JENNY PAGEL |
| ☐ LYLE KARNS | ☐ HERB MALONE |
| ☐ DON PHAGEL | ☐ CHESTER MURPHY |

TO:

| | |
|---|---|
| ☐ SARA BATES (NEW YORK) | ☐ L. M. PARKER |
| ☐ MARK PETAL (SCAN TO E-MAIL) | ☐ LYNN GROVER |
| ☒ GLEN SAMPRAS | ☐ FRANK HENDERSON |
| ☐ NOEL MACKIE | ☐ JAKE LANE |
| ☐ PAUL JONES (SAN FRANCISCO) | ☒ LAURIE MAYNER |
| ☐ GRETIN MACNAMARA | ☐ PAUL WOODWARD (CHICAGO) |
| ☐ KEN WOLF | ☐ KAREN LAMER (SCAN TO E-MAIL) |
| ☐ EVON KLUSKI | ☐ CLARK TOMPSON-JONAS CO. |
| ☐ TED SIMON (MILWAUKEE) | ☐ JOHN PACKER |
| ☐ ANNE BAKER (FAX) | ☐ LEE SUN (DETROIT) |

COPY CONTROL PANEL

COPY CONTROLS      NUMBER OF COPIES

| | | |
|---|---|---|
| ☐ FAST DRAFT (DEFAULT) | ☐ 1 | ☐ 6 |
| ☒ GREYSCALE | ☒ 2 | ☐ 7 |
| ☐ COLOR DRAFT | ☐ 3 | ☐ 8 |
| ☐ HIGH QUALITY COLOR | ☐ 4 | ☐ 9 |
| | ☐ 5 | ☐ 10 |

REDUCE ← → ENLARGE
☐ 50%  ☐ 67%  ☐ 93%  ☐ 100%  ☐ 150%  ☐ 200%
DEFAULT

SCAN CONTROL PANEL

SCAN QUALITY      RESOLUTION

| | |
|---|---|
| ☐ TEXT OR LINE ART | ☐ 75 DPI |
| ☐ GREYSCALE MODE | ☐ 150 DPI |
| ☐ COLOR DRAFT MODE | ☐ 200 DPI |
| ☐ HIGH QUALITY COLOR | ☐ 300 DPI |
| ☐ FLASHPIX MODE | |

LIGHTER ☐ ☐ ☐ ☐ ☐ ☐ DARKER
DEFAULT

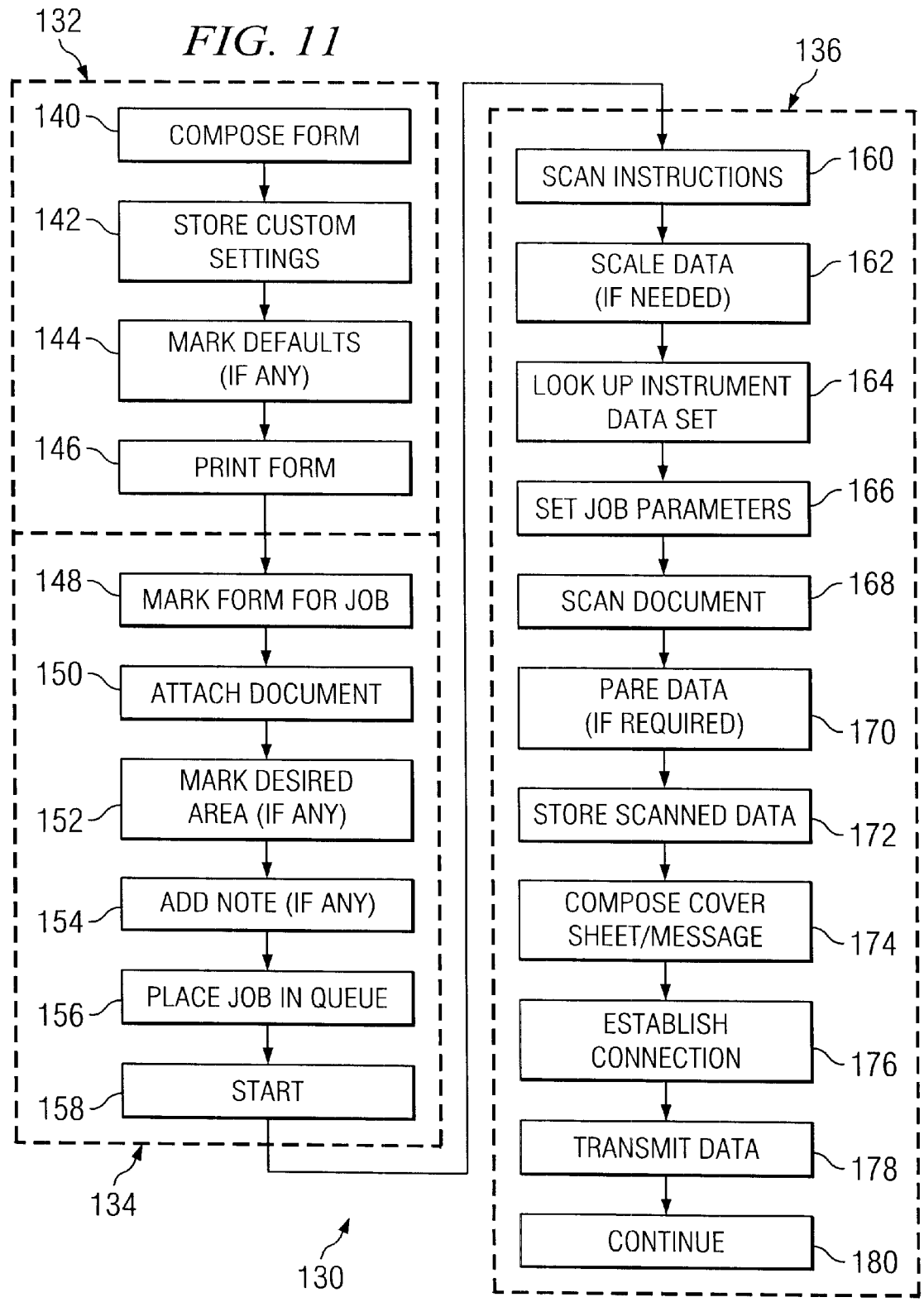

METHOD AND APPARATUS FOR CONTROLLING A SCANNING DEVICE

BACKGROUND OF THE INVENTION

1. Field of the Invention

The present invention relates generally to input of control parameters for systems including a scanning device, such as multifunction peripheral, copying machine, scanner or a facsimile machine. More particularly, the invention relates to a technique for inputting control parameters to manage batch-type processing of documents via instruction sets defined by graphical features on a form or document support.

2. Description of the Related Art

A wide variety of electronic devices are known and are currently used for managing documents such as printed materials, images, and so forth. In many such devices hardware and software are provided for digitizing images which are then reproduced, stored, analyzed, transmitted, or otherwise manipulated by a user or by a computer system. In a facsimile machine, for example, encoding devices detect light and dark regions on a page and transmit corresponding data to a receiving machine at a desired destination, where the data can be reconstructed into an image of the original document. Similarly, in both single color and multi-color scanners, all or portions of a document sheet are scanned and digitized by individual picture elements or pixels to generate data sets which can be used to reconstruct a portion or all of the original sheet. In many systems, the digitized information can be viewed by a user, such as via a computer monitor, and manipulated, such as for incorporation into a document or presentation.

User interfaces for document handling peripherals typically include a series of buttons or tactile elements which can be touched by a user to define desired instruction sets. The user may also view certain instructions as they are input via a display on a control panel or via a screen on which graphical information or words provide a readout of the instructions. For example, on a facsimile machine, a destination phone number is typically viewed on a small LCD panel as it is input. On digital copying machines, similar data may be viewed by the user to indicate desired reductions, single or multi-color reproduction, desired resolution, and so forth.

While such user interfaces are generally adequate for communicating certain instructions to the machine hardware and software, they are not without drawbacks. For example, depending upon the number of parameters available to the user, the interface may include a large number of keys or key combinations to accommodate the various instruction possibilities and operator adjustable parameters. Moreover, such user interfaces may require substantial time to input the desired settings. Such input may also open a possibility for error, such as in the composition of a destination telephone number for a facsimile transmission. For batch material handling, the inputs generally must be configured for each separate batch job, and are usually not set in advance, except to specific default conditions. If the default settings are not those desired by the user, the user must proceed through a sequence of steps to input the other settings prior to beginning the batch process.

There is a need, therefore, for an improved technique for adjusting settings of document handling systems such as multifunction peripheral devices, scanners, printers, facsimile machines, and so forth. There is, at present, a particular need for a technique which offers a simple and straightforward mechanism for altering settings on such devices with little or not operator intervention, thereby facilitating the use of various settings in sequential batch job-type operations.

SUMMARY OF THE INVENTION

The present invention provides a novel technique for defining instructions or settings in document handling systems designed to respond to these needs. The technique makes use of instruction sets which may be encoded on a document-type support and which, itself, can be fed through a document handling system along with documents to be scanned, stored, transmitted, or otherwise input. A wide range of document support types can be used, including document supports in which instruction sets are defined by graphical information or regions on a same page as the data to be input, as well as supports on separate pages which would typically precede the documents to be handled in a batch job. The instruction sets may consist of both machine readable codes, locations or reference points on the instruction region or page, as well as human readable indicia, including text defining the desired instructions. A wide variety of instructions may be provided, including input parameters such as scanning resolution, single or multi-color handling, copy collation, document scaling, and so forth. Moreover, the technique may be user-defined with references to stored data directly on a form or in a database. The database may include not only instructions for performing the scanning or input of the digitized data, but may further define post-encoding operations, including destination facsimile numbers, and so forth.

BRIEF DESCRIPTION OF THE DRAWINGS

The foregoing and other advantages of the invention will become apparent upon reading the following detailed description and upon reference to the drawings in which:

FIG. 3 is a layout of an exemplary instruction input sheet, including both machine and human readable indicia composed and customized by a user for controlling operation of the scanning device and for performing other functions, such as facsimile or electronic message transmission;

DETAILED DESCRIPTION OF SPECIFIC EMBODIMENTS

Figure 1:
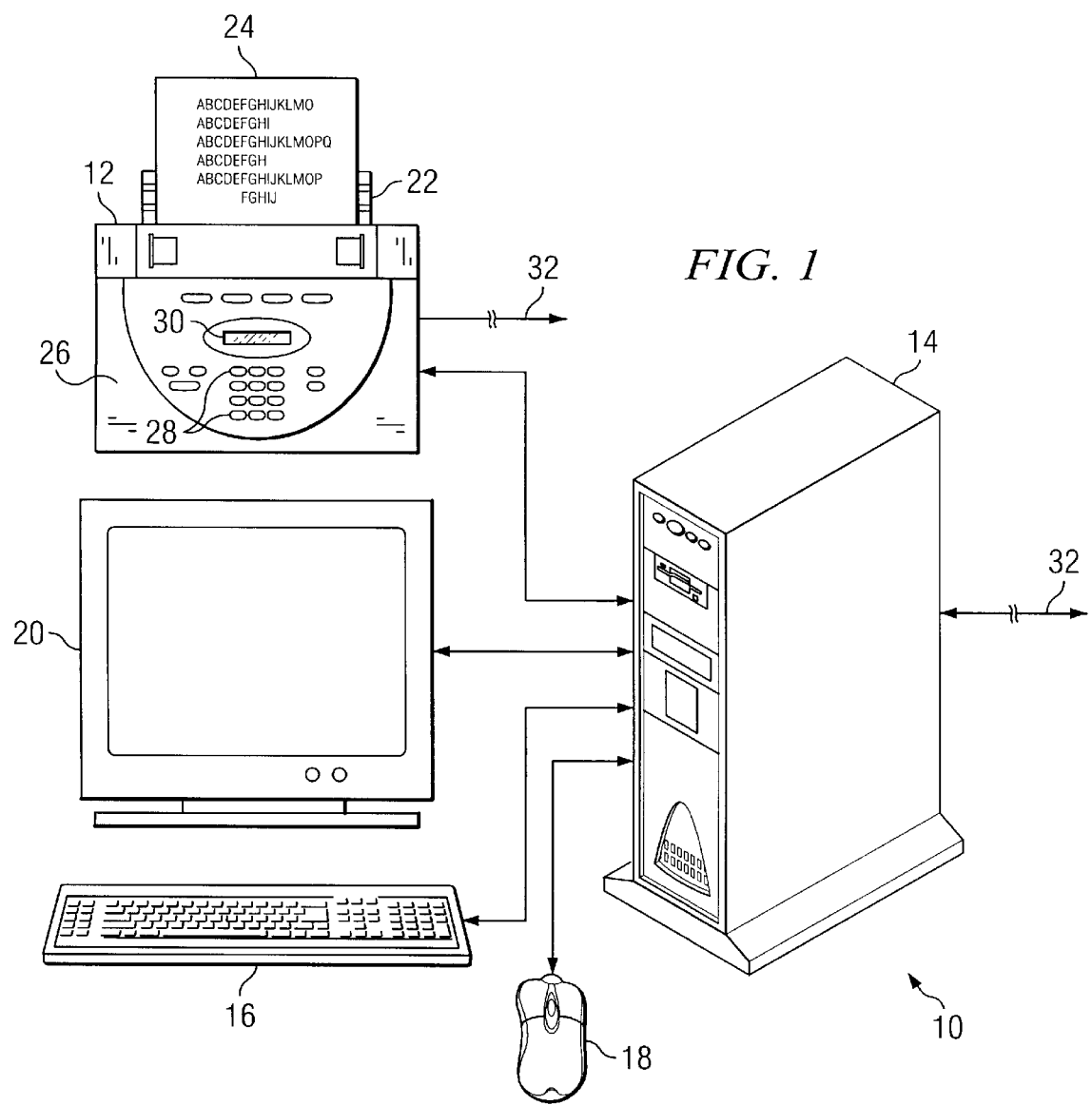
FIG. 1 is a diagrammatical representation of a computer system including a scanning device capable of generating digital data representative of a document.

Referring now to the drawings, and turning first to FIG. 1, a document handling or a computer system 10 is illustrated as including a scanning device 12, a computer 14, a keyboard 16, a mouse 18, and a monitor 20. System 10 is particularly well suited to inputting user-defined data, such as through the keyboard, mouse and monitor, as well as for inputting data by digitizing indicia on a page in the scanning device. In the illustrated embodiment, system 10 includes a stand-alone computer designed to carry out instructions based upon indicia disposed on a document as described more fully below. It should be noted, however, that the system may include a series of networked computers, servers, peripheral devices, and so forth. Also, in the illustrated embodiment described herein, scanning device 12 is linked to computer 14, and serves multiple functions, including scanning or digitizing documents, printing documents, transmission of facsimiles of documents, and so forth. Accordingly, the scanning device may rely on certain of the circuitry and programming embodied within the computer, or may rely solely upon its own stand-alone circuitry. In the latter case, certain of the techniques described herein may be employed on a self-sufficient device, such as a non-networked facsimile machine, multi-function peripheral device, photocopying machine, and the like.

As illustrated in FIG. 1, scanning device 12 is a sheet-feed scanner including a document feed tray 22 in which document 24 can be positioned for scanning. The present techniques may also be employed with hand-held scanners, flatbed scanners, and so forth. Device 12 further includes an interface panel 26 on which a series of input buttons or keys 28 are accessible by a user. Depending upon the particular configuration of the device, such keys may include conventional digit input keys, as well as particular function keys for executing such operations as scanning, copying, facsimile transmission, instruction input, and so forth. A read-out display 30 is provided on interface panel 26 to allow certain textual messages to be displayed for the user. Scanning device 12 may receive and transmit data via a telephone or similar network link 32. In the illustrated embodiment, computer 14 also includes a similar network link 32. Depending upon the system design, a single network link may suffice for the transmission and receipt of data to and from both the scanning device and the computer system.

Figure 2:
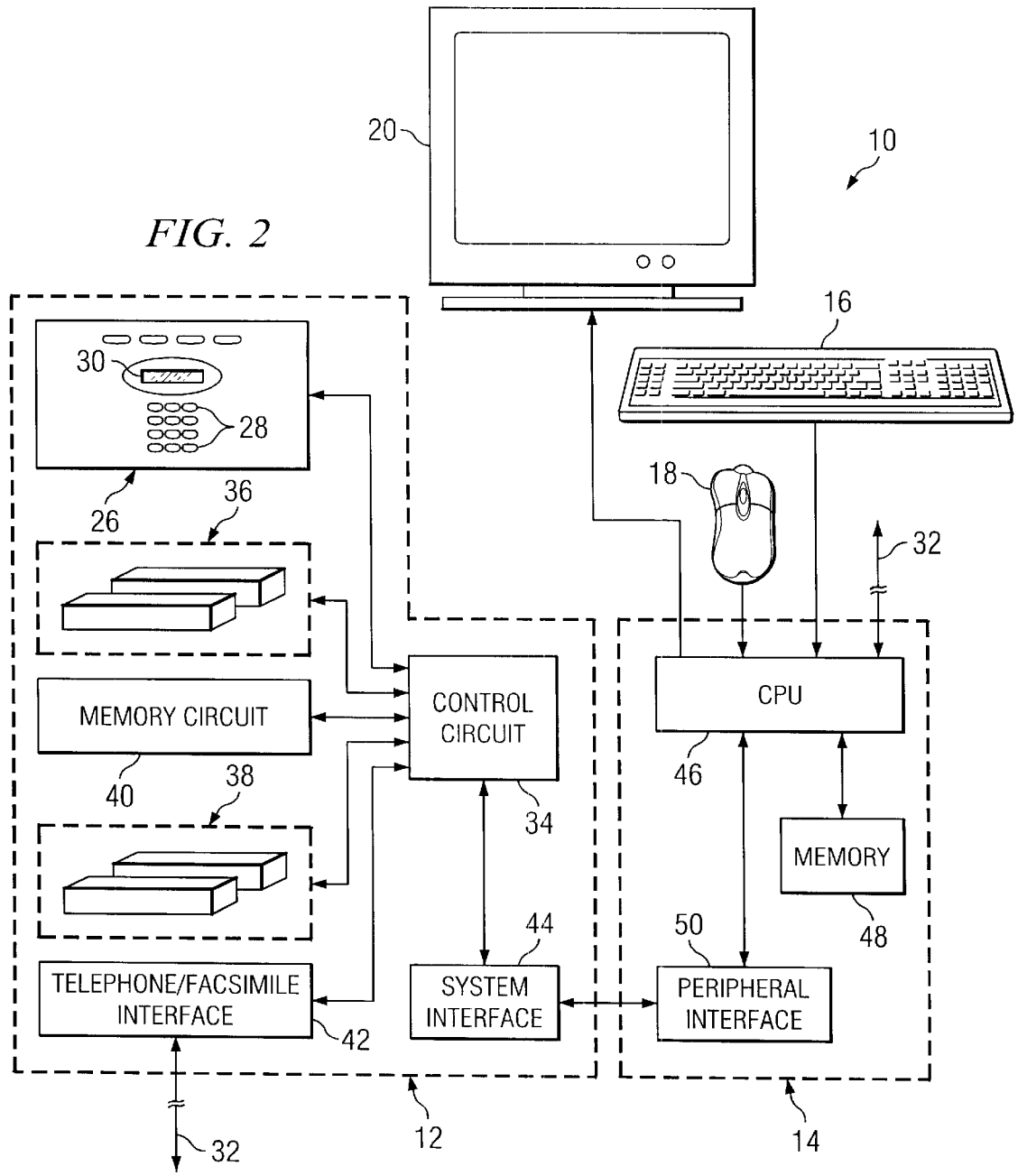
FIG. 2 is a diagrammatical view of certain of the functional components and circuits of the system of FIG. 1, including those of the scanning device and associated computer.

FIG. 2 illustrates certain of the functional circuitry and components of system 10 in a diagrammatical representation. As summarized above, the system generally includes a computer 14 linked to the scanning device 12. The user input and output devices, such as keyboard 16, mouse 18, and monitor 20, are linked directly to computer 14. While the scanning device 12 may include a wide array of functional circuits and hardware, depending upon its particular design, in the illustrated embodiment the device includes a control circuit 34 which is configured to execute programming code for independently controlling the operation of the various sub-circuits and components of the device. Thus, control circuit 34 is coupled to the input keys and display of interface panel 26 for receiving user-generated commands, and for displaying messages to a user. A scanning head 36 is provided within the device for digitizing indicia on documents fed into the device. As will be appreciated by those skilled in the art, scanning head 36 may be designed for either black-and-white scanning or for color scanning, or both. In general, such devices emit radiation to the surface of a document and detect reflections from the surface, encoding contrasting wavelengths differently to generate digital output data. The data is transmitted from scanning head 36 to control circuit 34 where it is processed as described below. A print head 38 is coupled to control circuit 34 to permit digitized data to be output on a printed page.

Control circuit 34 is also coupled to memory circuit 40. This circuitry will typically include stored data, including programming code executed by control circuit 34 for carrying out the functions described below. Moreover, memory circuit 40 includes operational parameters employed by the device in scanning documents, printing documents, transmitting digitized data, and so forth.

Device 12 further includes interface circuits linked to control circuit 34 for exchanging data with other remote components. Thus, a telephone/facsimile interface circuit 42 is provided for sending and receiving data defining documents in facsimile format. A system interface circuit 44 is also provided for receiving and exchanging data and commands from computer 14.

It should be noted that certain of the functionalities described herein are designed to be carried out on peripheral devices such as a scanning device, including both scanning and printing capabilities. However, certain of the present techniques may be employed on devices having more limited capabilities, including scanning capabilities alone. Similarly, for certain of the techniques described herein, a telephone/facsimile interface circuit may not be required, particularly where scanned data is transmitted to a memory circuit or computer system for archival storage, further processing, transmission through the associated components, and so forth.

In the embodiment illustrated in FIG. 2, computer 14 includes a CPU 46 linked to memory circuitry 48, as well as to a peripheral interface circuit 50. Computer 14 may be of any suitable type, such as a personal computer system, computer work station, laptop computer, and so forth. As will be appreciated by those skilled in the art, in general, CPU 46 executes pre-established programming code, typically in the form of application software. The code is stored in memory circuit 48 which may include hard disk drives, random access memory, dynamic random access memory, and so forth. Peripheral interface circuitry 50 may include hardware, firmware, and software for driving scanning device 12 and for executing specific functions such as transmitting and receiving data representative of both operational instructions or parameters, as well as digitized documents.

In accordance with the present techniques, scanning device 12 can receive instructions for its operation in one of several manners. Firstly, manually input commands can be formulated by depressing keys 28 on interface panel 26. As the keys are depressed, signals are transmitted to control circuit 34 for executing specific functions, typically by reference to code stored within memory circuit 40. Secondly, specific instruction sets can be transmitted to the device from computer 14. Finally, instructions can be input via an instruction support sheet on which machine and human readable indicia are provided. As described more fully below, the instruction support sheet may take various forms, depending upon the nature of the instructions to be provided, the document to be scanned, the operation to be performed during and following scanning, and so forth.

FIG. 3 illustrates an exemplary instruction or control input sheet 52 designed to be scanned and processed by scanning device 12. As shown in FIG. 3, sheet 52 includes a series of blocks or sections including descriptive text indicative of selectable settings or instructions. Adjacent to each instruction is a location which may be marked by the user, and which thereafter becomes an indication to the system that a specific setting or function is to be implemented or executed. In the illustrated embodiment, a form code 54 is provided in an upper region of the sheet and may be used to indicate to the system that the sheet represents instructions to be applied during a scanning or processing operation. In addition, the form code may cause the control circuit 34 to refer to a specific data set, thereby directing the interpretation of instructions contained on the form to various users, systems, and so forth, allowing a shared peripheral device or scanning device to be used for a number of different users who individually configure or customized such forms as described more fully below. In addition to form code 54, the sheet illustrated in FIG. 3 includes a series of facsimile control instructions, which may be referred to as a handling block 56, and a follow up block 58. In the illustrated embodiment these blocks include selections for configuring facsimile cover pages, applying company logos, designating an urgent status, generating confirmation reports in the form of hard copies, hard copies with cover sheets, e-mail confirmations, and so forth. In addition, a message block 60 is provided in which the user may write or type specific messages to be reproduced on a facsimile cover sheet, for example.

Additional blocks are provided in the illustrated embodiment for designating originating authors of documents or transmissions, as indicated at origin block 62, as well as for designating one or more destinations, as indicated at destination block 64. In a present embodiment, sheet 52 may be customized or configured by a user via computer 14, or a remote computer. During configuration of the sheet, data, such as names, addresses, location designations, and so forth, are input into a configuration application which composes instruction input sheet 52. Textual descriptions of the configurations, including the names of common authors or destinations are then laid out on the sheet for selection by the user. As described below, each name is then associated with additional data stored within computer 14 or within memory circuit 40 of scanning device 12 to be accessed when the corresponding selection is made by the user.

In the case of the instruction input sheet 52 of FIG. 3, a series of copy and scan control options are displayed and made available to the user. For example, copy control blocks 66 are provided, including an image quality block 68 and a number of copies block 70. The copy controls block permits the user to select gray scale, color scanning, and other options, while the number of copies block allows the user to select the number of copies to be produced. Scan control blocks 72 may include mode selections 74 and resolution selections 76. Moreover, additional blocks may be provided for such parameters as document reduction or enlargement as indicated at reference numeral 78, and document darkness or contrast control as indicated at reference numeral 80. As will be appreciated by those skilled in the art, a wide variety of additional selectable instruction sets may be encoded on the input sheet. For example, in a present embodiment, the selectable instructions include a collate function in a copy control block. Similarly, scan control functions may include such operations as identification of a destination directory, designation of a preferred format (e.g. BMP, JPG, TIFF, and so forth).

It should be noted that certain of the instructions provided on sheet 52 may be specific to the scanning device or system, while other instructions may be specific to users or organizations. For example, the facsimile control options may be expanded or reduced, depending upon the preferences of the user or organization. Similarly, where the sheet is customized for a single user, the origin block 62 may be reduced or eliminated. Moreover, as will be appreciated by those skilled in the art, in many scanning devices and associated systems, a large number of controllable parameters may be adjustable by control circuit 34 or external circuitry. Thus, the options provided within the copy control, scan control, and other instruction groups may be significantly expanded or reduced, depending upon the flexibility of the scanning device, the capabilities of the system, the desires of the system user, and so forth. In general, however, any control parameters which are available through the code implemented by the scanning device, or by a component associated with the scanning device for subsequent processing of scanned images, may be provided on the instruction sheet. These parameters include any such parameters which are typically input via keystrokes on conventional scanners, copiers, printers, and so forth.

Each textual description of a selectable input on sheet 52 is associated with a reference location which is evaluated by the control circuitry to identify user selections. In the illustrated embodiment, such locations are designated by squares adjacent to each textual description. Upon composition of the sheet, these reference locations are identified and stored in the sheet configuration. This data may be stored either in the scanning device or in a computer memory or other component associated with the scanning device. Moreover, certain data may be encoded directly on the input sheet, such as telephone numbers for facsimile transmissions, and so forth, reducing or eliminating the need for referring to specific data sets preconfigured by the user. In general, the reference locations are used to identify annotations made to the sheet corresponding to specific selections. Thus, upon reading the text, designated generally by reference numeral 84 in FIG. 3, a user may make a mark or define such a mark by typing, selection in an application routine, or in another manner, in a specific reference location on the form. The instruction set defined by the selections is then identified by scanning the form and evaluating the locations of discrete picture elements or pixels corresponding to the reference locations.

In a present embodiment, certain of the locations may be identified as default settings, as indicated by reference numeral 86 in FIG. 3. Such default settings may be called out to the user by textual descriptions, or may be lightly colored, crossed or otherwise marked. Marks 88 made by the user on the form then indicate desired selections which may be used to override the default settings. Moreover, as described more fully below, when the digitized data is processed, certain of the selections may be mutually exclusive, while others may permit multiple selections. This is particularly the case of such settings as resolution, scan quality, number of copies, and so forth. Examples of allowable multiple selections might include facsimile controls such as cover page generation, urgent status, as well as multiple addressees, and so forth.

The reference locations corresponding to the selections of the instructions on sheet 52 may be identified in several manners. In a present embodiment, reference is made to known or identifiable reference or register points at anticipated locations on the instruction input sheet. In the case of the sheet of FIG. 3, a reference point 90 may be identified in an upper corner of the form and a second point 92 in a lower corner. The specific location of specific selections may then be identified by scaling the digitized sheet between the known reference locations. In this manner, variations in scanner feed rates, resolutions, orientations, and the like may be accommodated while maintaining an acceptable degree of accuracy in evaluation of the encoded instructions.

The instruction input sheet or similar instruction sets may be defined in any of a variety of configurations and associated with documents in various manners. For example, the instructions input sheet 52 of FIG. 3 is particularly well suited to processing batch document handling tasks in scanning, copying and similar devices. As used herein, the term "document" should be understood to include indicia or markings that are scanned and acted upon generally. Such documents may be provided on the same or different sheets or pages from the instructional indicia, and may or may not include human readable characters. Moreover, the term "indicia" is intended to relate generally to any marking or contrasting characters or regions that are detectable by the scanning device.

Figure 4:
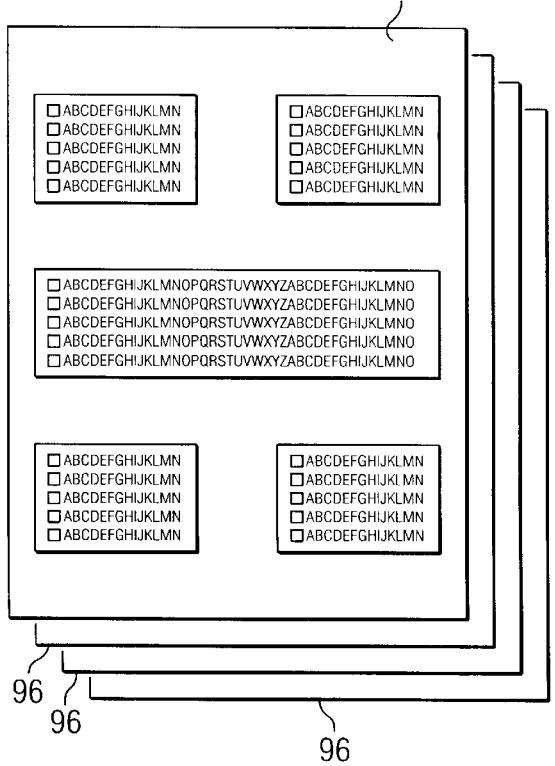
FIG. 4 is an illustration of a batch process file, including an instruction sheet of the type shown in FIG. 3 and a series of document pages disposed after the instruction sheet in the batch.

FIG. 4 illustrates the manner in which the instruction input sheet would be employed in such batch processing. As shown in FIG. 4, once composed and annotated with desired selections marked, the sheet becomes a cover document for a batch job as indicated by reference numeral 94. One or more subsequent document pages 96 are positioned behind the input sheet. When processed, the instruction input sheet is digitized first, the particular desired instructions are encoded, accessed and loaded, and the subsequent pages of the batch are then digitized and processed. Thus, the instruction input sheet may serve as a cover sheet for a facsimile transmission batch job, for example, in which the sheet defines the manner in which the document is to be scanned, scaled, and so forth, as well as the origin and destination of the data transmission. Similarly, the sheet may serve to direct the system to encode and transmit electronic messages including the document as an attachment or insert. Moreover, where an annotated message is employed on the sheet, such as in a message block 60 (see FIG. 3), a cover page may be composed by the scanning device or by an associated computer, including reproduction of the message contained in the block.

Figure 5:
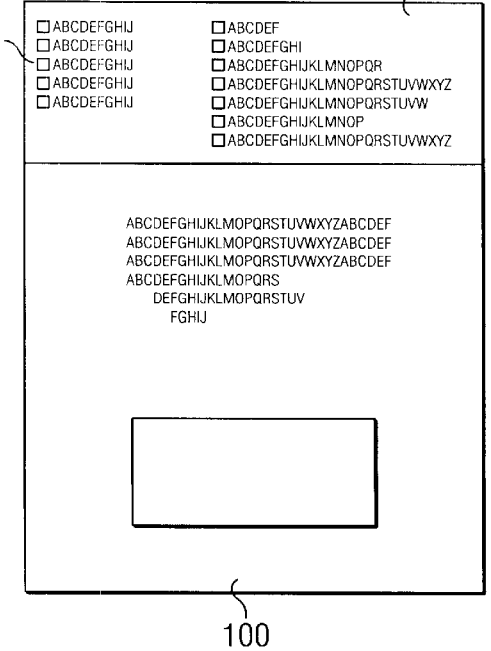
FIG. 5 is an exemplary illustration of an alternative configuration for a document support including an instruction set and a document support region.

In other presently contemplated embodiments, certain instructions of the type described above may be encoded on a specific area or designated region of a document support. As illustrated in FIG. 5, for example, sheet 52 may include a designated instruction area 98 in which preset or user-configurable instruction selections are defined in human readable text associated with reference points as described above. A document area 100 is provided adjacent to the instruction area for supporting text, images, and so forth. As before, when the document support is scanned, instructions encoded in the instruction area are referenced and used to define parameters for scanning, processing, transmitting and performing other operations on the digitized data corresponding to the information in the document area 100.

Figure 6:
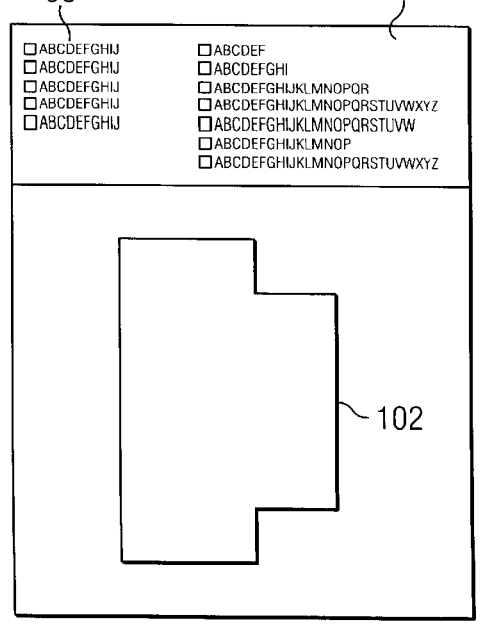
FIG. 6 is a further alternative configuration of a document support, including a designated scanning area and an instruction set.

FIG. 6 shows a further alternative configuration similar to that of FIG. 5 but wherein a specific document is applied to the document area. Thus, document 102 may comprise supports, such as paper, on which articles, photographs, receipts, and so forth are positioned.

Figure 7:
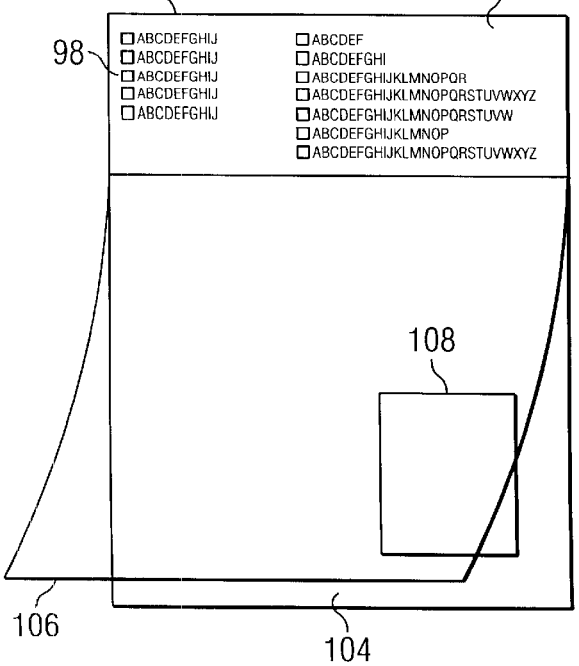
FIG. 7 is a further alternative configuration of a document support, including a base and an overlay sheet.

A further alternative configuration for a document support including an instruction set is illustrated in FIG. 7. The instruction input sheet 52 of this embodiment includes a document support base 104 over which a transparent overlay sheet 106 is positioned. As before, an upper region of the support carries specific user-selectable instructions within an instruction area 98. A document 108 may be positioned on the base 104 and the overlay sheet laid down over the document. The overlay sheet may be conveniently secured to the base at an upper edge 110. When the document is positioned on the support, the entire instruction input sheet 52 may then be scanned and the user selected instructions employed for scanning and processing the document supported below the overlay. As described more fully below, certain of the instructions provided on the overlay sheet may identify specific regions of the support corresponding to the location of the document. This feature of the present technique permits specific selection of a spatial region for scanning. Thus, where smaller documents, such as photographs, receipts, notes, and so forth, are to be encoded, stored, transmitted or otherwise processed, the entire support area in which document 108 is positioned, need not be scanned. Alternatively, when the entire area is scanned, only data corresponding to the selected region may be stored in memory or transmitted from the system.

Figure 8:
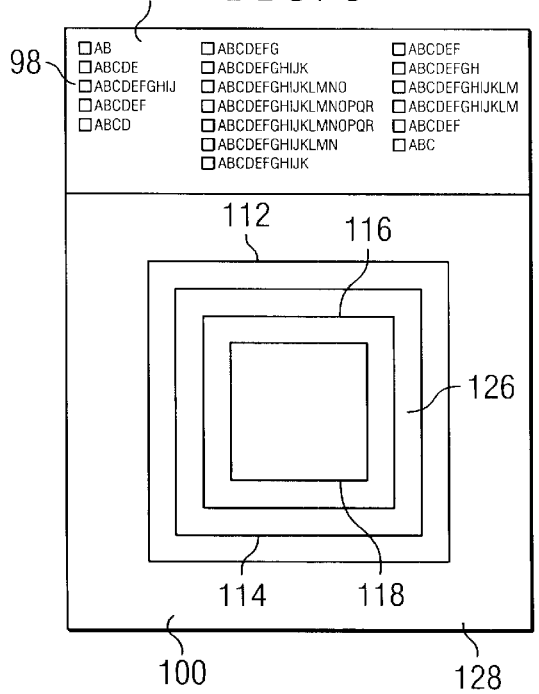
FIG. 8 is an exemplary document support, including a series of spatial regions which can be selectively scanned in accordance with instructions on the support.
Figure 9:
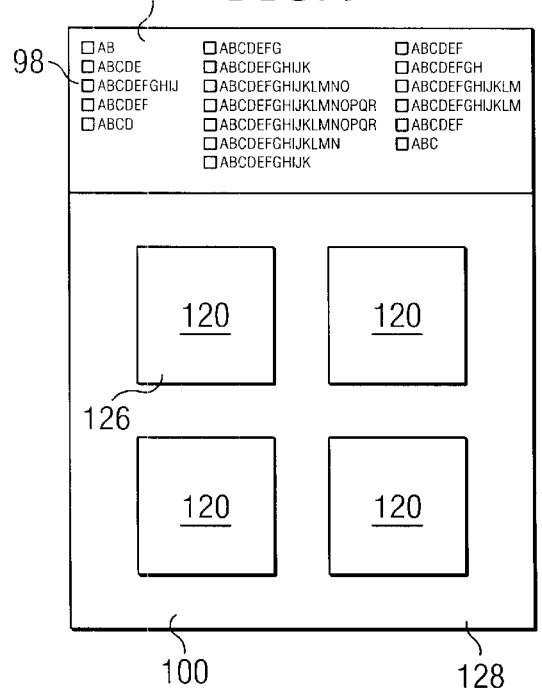
FIG. 9 is an alternative configuration of a document support, including separate selectable spatial regions.
Figure 10:
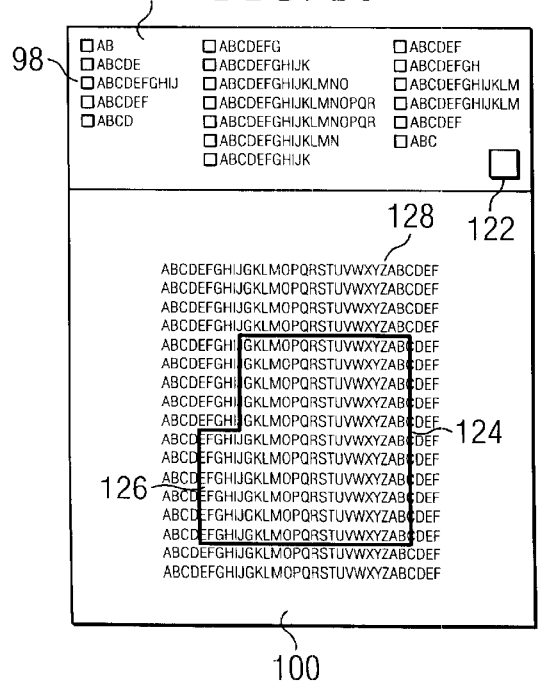
FIG. 10 is a further alternative configuration of a document support, including an instruction set and a designated spatial region surrounded by an outline; and, FIG. 11 is a flow chart illustrating exemplary control logic in composing a form of the type illustrated in the preceding figures, inputting instructions contained graphically on the form, and executing an operation based upon the instruction set.

FIGS. 8, 9 and 10 illustrate presently contemplated configurations of instruction input sheets 52, specifically adapted for selection of desired spatial regions for scanning or processing. In all of the illustrated examples, a single sheet is employed including both the instruction set, as well as the document. It should be noted, however, that the same technique may be employed for document processing in which the document to be scanned is positioned on a subsequent page in a batch with an instruction input sheet of the type described above.

As shown in FIG. 8, spatial regions may be designated having predetermined sizes and locations on document area 100. Such areas may be conveniently nested to provide a range of areas which can be selectively scanned. In a present embodiment, lines defining each nested area are formed on the instruction input sheet and a user may selectively place the document in the center of the sheet and select the appropriate outline that corresponds to the size of the document. The sheet illustrated in FIG. 8 may be accompanied by a transparent overlay page as described above with reference to FIG. 7. In the illustrated embodiment, a series of outlines 112, 114, 116 and 118 are provided on the instruction sheet. In use, each such area would be identified by a corresponding descriptive selection in instruction area 98 which the user can check to select the corresponding area. Thereafter, only the corresponding area is scanned and processed. Alternatively, as described more fully below, the entire width of the page may be scanned and processed, with only a portion of the width being saved in memory, transmitted, and so forth.

FIG. 9 illustrates an alternative configuration for selective spatial scanning in which a series of document areas 120 are disposed in adjacent locations within the document area 100. Again, each spatial location may be designated by a code, and corresponding selectable codes along with descriptive text provided in instruction area 98. It should be noted that one or more of the designated spatial regions may be scanned from document areas such as those shown in FIG. 9. Moreover, such regions may be stored as a single image or as separate images, and processed accordingly.

In the alternative configuration illustrated in FIG. 10, a document may be provided within document area 100, and only one or more specific outlined regions of the document are scanned. In the embodiment of FIG. 10, an outline designation 122 may be thus provided in the instruction area 98, and a corresponding outline 124 formed around a desired region of the document. Again, the sheet 52 of FIG. 10 may be covered by a transparent overlay, permitting an erasable outline 124 to be formed over a document disposed beneath the transparent overlay. In the case of color scanners, outline designation 122 may provide a specific color which is used to form a perimeter or border of the scanned area. Similarly, single color or black-and-white scanners may employ a sufficiently contrasting border to permit selective scanning of the designated area.

For the foregoing spatially selective scanning technique, it should be noted that selected document regions or areas 126 are scanned to the exclusion of adjacent areas 128. In practice, the document support may have an overall scannable width that includes both the desired area 126 and a portion of the extraneous area 128 adjacent to the selected area. For scanners that are configured only for scanning full widths, the entire width of the selected region may be initially scanned, and control circuit 34 or an associated computer system may then pare the encoded data to eliminate adjacent extraneous regions 128. Similarly, the scanner may digitally encode the entire document and store only the selected region 126, paring out data corresponding to the extraneous regions 128 both above, below and to the sides of the selected region. Thus, the technique permits a reduced file size to be handled, stored, transmitted, and otherwise processed for small documents or portions of documents. It should also be noted that the spatially selective scanning technique described herein may be employed to selectively eliminate portions of documents in a similar manner, such as to redact out portions of scanned documents. In such cases, the selected regions, such as region 26 in FIG. 10, may include undesired or redacted material, whereas extraneous regions 128 may include the desired passages or sections.

The foregoing system is preferably implemented via application software which is used to generate or customize the particular instruction sets or selections contained on the instruction input sheet. Such application software may be conveniently stored in memory 48 of computer system 14 and provided with a graphical user interface in a conventional manner. Once the instruction input sheet is composed, the sheet may be stored in memory circuit 48 and printed for subsequent annotation and use. As noted above, a range of such instruction input sheets may be accommodated by the system, inputs on each sheet corresponding to operational parameters of the scanning device, or of the overall system, or to specific selections of a user. Thus, where a user composes specific parameters, such as addresses, identifications, telephone numbers, and so forth (e.g. for destinations of facsimiles) this data is stored in a data set or database either within the computer system or within memory circuit 40 of the scanning device. Thereafter, the data is accessed by the scanning device or by the computer system upon recognition of the instruction input sheet. As noted above, certain specific data, such as telephone numbers, may be included directly on the instruction input sheet.

FIG. 11 illustrates exemplary steps in control logic for carrying out the various functions summarized above. This control logic, designated generally by reference numeral 130 in FIG. 11, includes steps for composing or customizing instruction input sheets, as noted as reference numeral 132, steps for preparing and initiating system configurations via the input sheets as noted at reference numeral 134, and steps for processing scanning and other tasks using the input sheets as noted at reference numeral 136.

Referring first to the instruction input sheet preparation steps 132, as noted at step 140, the form or input sheet is first composed via application software. The software may be employed at a computer terminal coupled to the scanning device, or at a remote terminal. As noted above, the composition of the sheet may include standard operational parameters controllable for the scanning device, as well as other parameters including those calling upon applications such as cover page layouts, confirmation form generation, facsimile or electronic message transmission, and so forth. At step 142, customized information corresponding to certain of the instructions on the composed instruction input sheet are stored in memory (or directly on the input sheet). While parameter information for the scanning device may be specified by the scanner manufacturer or driving software, other information on the input sheet may include user-set data, such as destination addresses, and similar information. This information is stored in data sets or databases either within the scanning device or within a computer system linked to the scanning device. As noted above, this information may further include preconfigured forms, such as facsimile cover sheets, confirmation reports, company logos, and so forth. At step 144, any default values applicable for the selectable parameters are marked on the composed input sheet. At step 146 the instruction input sheet is stored and printed for subsequent use. Where desired, the sheet may be simply maintained as a file within the computer system to be later called and completed as needed. Following such completion, the form is printed for scanning.

The job or batch preparation steps 134 begin at step 148 where the instruction input sheet is marked or annotated by the user. By way of example, the user may select facsimile controls, add a hand annotated note to a message block, designate specific recipients of facsimiles or electronic message transmissions, and so forth. At step 150 the desired document (if any) is attached or associated with the instruction input sheet either on the same page as the instructions or on a separate page or pages. At step 152 a desired spatial region of the form is selected, if applicable, as noted above with regard to FIGS. 8, 9 and 10. At step 154 any applicable notes may be added to the form prior to scanning. At step 156 the instruction input sheet and document are inserted into the scanning device and, where the scanning device is equipped to accept a series of jobs in batch fashion, the job is placed in a queue. Finally, at step 158 the operation is launched by simply depressing an appropriate key on the interface panel of the scanning device. The scanning device ends processing upon detection that no further document pages are present. Alternatively, where a series of batch files are stacked in the scanning device, each subsequent job in the series may be independently processed without operator intervention by simply detecting the presence of an additional instruction input sheet. The subsequent job may be initiated automatically or by operator selection of a "start" key, in either case, utilizing the selections on the subsequent instruction sheet.

Following initiation of the processing, the instructions encoded on the instruction input sheet are scanned and the job is processed as indicated by the steps of routine 136. These steps begin at step 160 where the instruction set is scanned and digitized. As noted above, reference locations corresponding to each selectable instruction are identified by contrast with the surrounding areas or the form background. Such contrast may include black-and-white pixel comparisons, gray scale comparisons, or color comparisons. Where desired, the instruction input sheet or the instruction area on a sheet may be scaled by reference to known or anticipated locations of reference or register points on the sheet to properly identify the selected instructions, as indicated at step 162.

Based upon the contrast provided at the referenced locations, control circuit 34, operating independently or in conjunction with CPU 46 or a similar processor, evaluates the digitized data by comparison to instruction data set files stored in memory. Again, such data sets may include parameter settings for the scanning device or the system, as well as user-defined operational parameters. At step 166, the identified parameters are set for use in the scanning or processing routines executed by control circuit 34 or the associated computer system. At step 168 the document associated with the instructions is scanned, employing the parameters set at step 166.

Subsequent to digitizing the information contained in the document, any desired processing, storage or transmission steps may be performed as defined by the user-selected instructions. For example, as indicated at step 170 in FIG. 11, certain data scanned and encoded at step 168 may be pared from the resulting data set. For example, in the case of spatial selections made using forms such as those illustrated in FIGS. 8, 9 and 10, peripheral or extraneous pixel data outside the desired spatial area may be eliminated from the document file. At step 172 the scanned data may be stored for temporary or archival purposes. At step 174, for example, a cover sheet or message may be generated as selected by the user. It should be noted that such operations may call upon additional application software, such as electronic messaging software, document or text editing software, and the like. At step 176, where data transmission is instructed, a connection is established either between the scanning device directly or between an associated networked computer system and a telephone system or a data transfer network. Where such data transmission is desired, at step 178, the data is transmitted in a conventional manner. Following execution of all of the operations desired in the job, the routine terminates at step 180 and continues any subsequent operations.

As indicated above, the logical steps involved in composing, printing and processing the individual information input sheet or form may be considered to be entirely separate from the steps involved in preparing a job to be handled based upon the input sheet. Thus, sample or model forms may be prepared in advance of delivery of a system or scanning device to a user, such as by an original equipment manufacturer or software developer. An application delivered with the product may then prompt the user to input relevant information such as facsimile names, telephone numbers, user defaults, and so forth. The general purpose or specially configured form may then be printed at any convenient time for use in controlling a process involving the scanning function. This printing operation may be performed local to the scanning device, without requiring the user to gain access to a computer system or other device, where desired. Within the process steps described above, various steps may be added or deleted depending upon the type of processing desired. For example, for copy-only uses, the foregoing steps relating to facsimile transmissions would, of course, be unnecessary. Similarly, for scanning operations, documents may be encoded and stored for later retrieval, such as in the form of hard-copies, facsimile copies, reconstituted versions displayed on a computer monitor, and so forth. Moreover, where a simple facsimile message or electronic message is to be transmitted, the information input sheet itself may provide any necessary destination addresses, messages, and the like. The printed indicia on the form which is scanned into the machine for processing may be included in such messages or facsimile transmissions by simple reproduction or by character recognition software, and the like.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A user configurable document processing system including a scanning device, the system comprising:
   an instruction support sheet associated with data to be scanned and including human readable originator name identifiers at a first defined area of the support sheet, human readable destination identifiers at a second defined area of the support sheet, and human readable scan control parameters at a third defined area of the support sheet; each of said human readable identifiers associated with a control area disposed at an individual predetermined location with respect to that identifier, and scannable indicia at selected ones of said control areas in at least said first and second defined areas, including scannable indicia at control areas associated with at least one of said human readable originator name identifiers and with a plurality of said destination identifiers; a scanning device configured to scan the instruction support sheet and to generate signals representative of the scanned indicia and data; a signal processing circuit and a memory circuit, the signal processing circuit being configured to compare the signals generated in response to scanning said indicia to a data set stored in the memory circuit and to execute an operation based upon the comparison, said operation including scanning said scan data according to predetermined default scan control parameters unless overridden by response to scanned indicia at one or more control areas in the third defined area of the support sheet, and to control transmission of said scanned data in accordance with each of said plurality of destinations identified by a said selected destination identifier.

2. The system of claim 1, wherein the transmission includes a facsimile transmission of the scanned data.

3. The system of claim 1, wherein said scannable data is provided on a document in a batch preceded by the instruction support sheet.

4. The system of claim 1, wherein the data set includes address codes associated with respective ones of said destination identifiers, and wherein the operation includes transmission of scanned data from the system to remote locations corresponding to address codes.

5. The system of claim 1, further comprising an operator interface for composing at least a portion of the indicia on the instruction support sheet.

6. The system of claim 5, wherein the data set includes data input into the system via the operator interface.

7. The system of claim 1, wherein the indicia are disposed on a scannable face of said support sheet and have sufficient optical contrast from the face to permit optical encoding of the indicia and corresponding locations of the indicia on the face.

8. The system of claim 7, wherein at least some of the indicia are erasable.

9. The system of claim 1, wherein the support sheet includes a first region including the first, second and third defined areas and a separate message area for containing at least some of said scannable data.

10. A system according to claim 1, wherein the system is operable to control transmission of scanned data resulting from a scanning operation to at least one facsimile destination and at least one electronic message destination.

11. A system according to claim 1, wherein said instruction sheet includes a scannable alignment reference marker and locations of said scanned control areas are determined with reference to data resulting from scanning said alignment marker.

12. A system according to claim 1, wherein said scan control parameters include one or more of scan quality, scan resolution and scan contrast.

13. A system according to claim 1 further including data copying functionality, wherein the instruction sheet includes human readable copy control parameter identifiers at a fourth defined area of the instruction sheet; each of said human readable copy control parameter identifiers associated with a control area disposed at an individual predetermined location with respect to that identifier, and wherein said scanning device is operably responsive to scan detection of control areas in said fourth predetermined area to carry out a copying operation of said data according to predetermined default copy control parameters unless overridden by scan detection of indicia at one or more control areas in the fourth defined area of the instruction sheet.

14. A system according to claim 13, wherein said copy control parameters include one or more of: copy quality, copy image area, and number of copies.

15. A system according to claim 1, wherein said document processing system includes a communications interface via which facsimile transmissions can be effected directly from the document processing system.

16. A system according to claim 1, wherein said document processing system is operable coupled to a computer and wherein electronic messages are transmitted from the system to the computer for communication to the or each electronic message address corresponding to a destination identifier associated with a control area in said second area at which an indicia is present.

17. A user configurable document processing system including a scanning device, the system comprising:
  an instruction support sheet including a base sheet and an optically transparent overlay secured over the base sheet, said control sheet associated with data to be scanned and including human readable originator name identifiers at a first defined area of the support sheet, readable destination identifiers at a second defined area of the support sheet, and human readable scan control parameters at a third defined area of the support sheet; each of said human readable identifiers associated with a control area disposed at an individual predetermined location with respect to that identifier, and scannable indicia at selected ones of said control areas in at least said first and second defined areas, including scannable indicia at control areas associated with a plurality of said destination identifiers; said support sheet further including a message area for containing at least some of said scannable data located in a region of the support sheet separate from said first, second and third defined areas; a scanning device configured to scan the instruction support sheet and to generate signals representative of the scanned indicia and data; a signal processing circuit and a memory circuit, the signal processing circuit being configured to compare the signals generated in response to scanning said indicia to a data set stored in the memory circuit and to execute an operation based upon the comparison, said operation including scanning said data according to predetermined default scan control parameters unless overridden by response to scanned indicia at one or more control areas in the third defined area of the support sheet, and to control transmission of said scanned data in accordance with each of said plurality of destinations identified by a said selected destination identifier.

18. The system of claim 17, wherein said signal processing circuit is responsive to boundary markings on said transparent overlay to limit scanning of said data to an area bounded by said boundary markings.

19. The system of claim 18, wherein said boundary markings are erasable.

20. A method for controlling operation of a scanning device including electronic data transmission functionality, comprising:
  providing a control sheet associated with scannable data, said control sheet including user selectable operational parameters, including human readable originator name identifiers at a first defined area of the control sheet, and human readable destination identifiers at a second defined area of the control sheet, said control sheet further including a plurality of user selectable data scan areas at a region of said control sheet separate from said first and second defined areas, and human readable data scan area identifiers in said region of the control sheet, each of said human readable identifiers associated with a control area disposed at an individual predetermined location with respect to that identifier;
  placing indicia at desired ones of said control areas, including indicia at control areas associated with at least one of said human readable originator name identifiers and with a plurality of said destination identifiers and with at least one of said data scan area identifiers to select one or more of said data scan areas; and
  operating the scanning device to scan the control sheet, said scanning device responsive to scan detection of said indicia during said scan operation to control transmission of scanned data from the or each selected data scan area in accordance with each of said plurality selected destination identifiers.

21. The method of claim 20, wherein the control sheet includes a further area including said scannable data.

22. The method of claim 21, wherein the scannable data is provided on one or more sheets separate from the control sheet and located at or overlapping said further area of the control sheet but not overlapping said first and second defined areas, and wherein scanning of said data is effected by localizing a part of said scanning operation within said further area.

23. A method according to claim 20, wherein said transmission is effected by transfer of said scanned data and associated origination and destination data to a computer for onwards transmission to each of said plurality of destinations.

24. A method according to claim 20, wherein said transmission includes facsimile transmission to each of said plurality of destinations.

25. A method according to claim 20, wherein said transmission includes facsimile transmission to at least one of said plurality of destinations and email transmission to at least one of said plurality of destinations.

26. A method according to claim 20, wherein said control sheet includes fourth defined area including human readable transmission control identifiers each associated with a control area disposed at an individual predetermined location with respect to that identifier; and wherein detection of indicia present at one or more of said control areas in the fourth defined area during said scan operation causes corresponding responsive action by the scanning device.

27. A method according to claim 20, wherein said user selectable data scan areas are indicated by boundary markers on said control sheet.

28. A method according to claim 27, wherein said boundary markers define nested rectangular areas.

29. A method according to claim 27, wherein said boundary markers define spaced apart rectangular areas.

30. A method for controlling operation of a scanning device including electronic data transmission functionality, comprising:

providing a control sheet associated with one or more documents including scannable data, said control sheet including user selectable operational parameters, including human readable originator name identifiers at a first defined area of the control sheet, human readable destination identifiers at a second defined area of the control sheet, and human readable scan control parameters at a third defined area of the control sheet; each of said human readable identifiers associated with a control area disposed at an individual predetermined location with respect to that identifier;

placing indicia at desired ones of said control areas in at least said first and second defined areas, including indicia at control areas associated with at least one of said human readable originator name identifiers and with a plurality of said destination identifiers;

operating the scanning device to scan said control areas on the control sheet and the scannable data on said one or more documents to be scanned, said scanning device responsive to scan detection of indicia scanned at control areas to carry out a scanning operation of said document(s) according to predetermined default scan control parameters unless overridden by indicia at one or more control areas in the third defined area of the control sheet, and to control transmission of scanned data on the or each scanned document to each of said plurality of destinations identified by a said selected destination identifier.

31. The method of claim 30, wherein the document is disposed on the control sheet.

32. The method of claim 30, wherein the document is disposed on at least one page following the control sheet.

33. The method of claim 30, wherein the control sheet includes a support carrier on which at least a portion of the document is supported.

34. A method according to claim 30, wherein said transmission includes facsimile transmission to a plurality of said destinations.

35. A method according to 30, wherein said transmission includes facsimile transmission to at least one of said plurality of destinations and email transmission to at least one of said plurality of destinations.

36. A method according to claim 30, wherein said control sheet includes fourth defined area including human readable transmission control identifiers each associated with a control area disposed at an individual predetermined location with respect to that identifier; and wherein detection of indicia present at one or more of said control areas in the fourth defined area during said scan operation causes corresponding responsive action by the scanning device.

37. A method according to claim 30, wherein said scanning operation determines the locations of scanned control areas by reference to scanning an alignment marker at a reference location on the control sheet.

* * * * *